Figure 1:
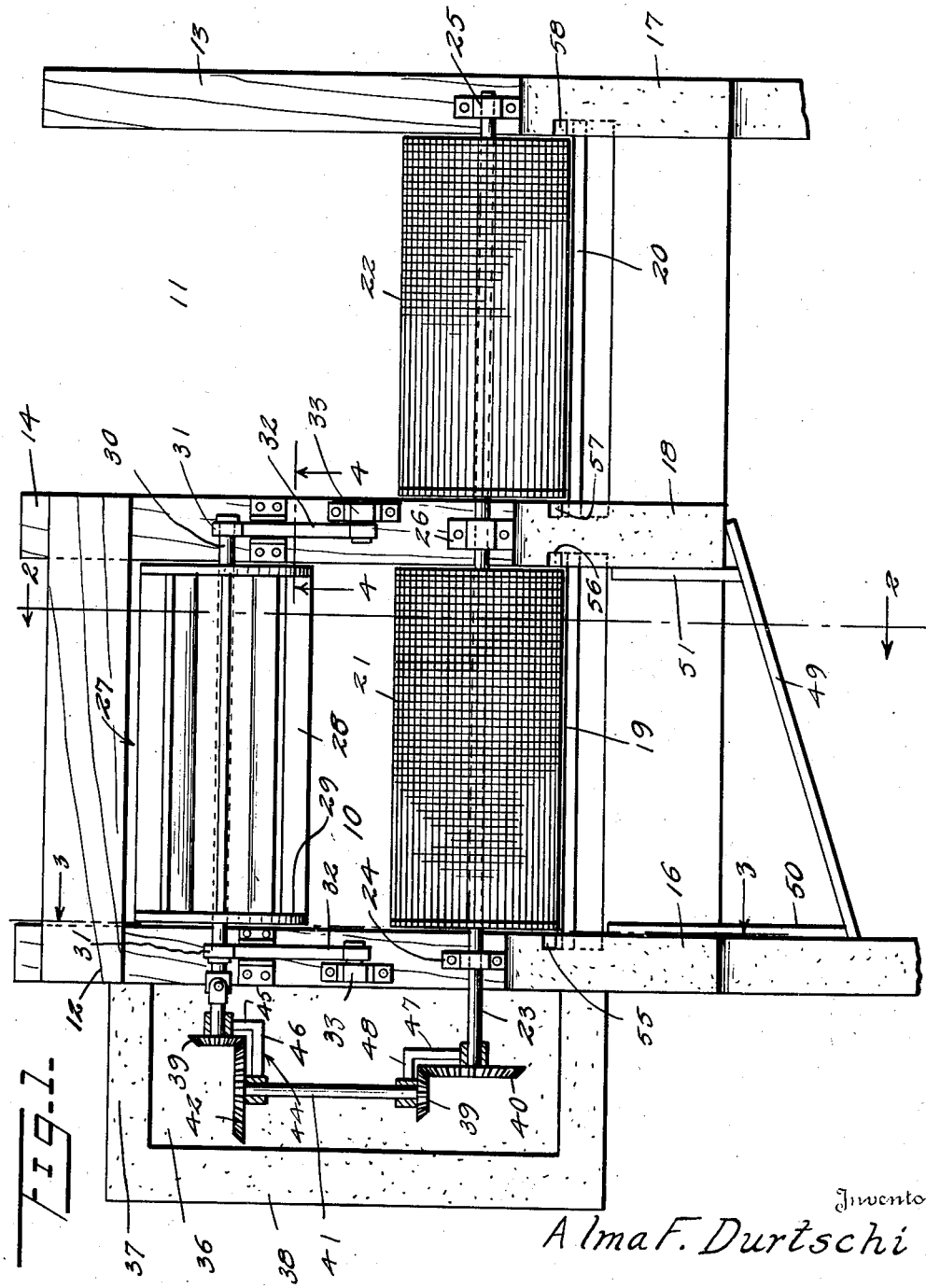

May 6, 1941.  A. F. DURTSCHI  2,240,642
FISH SCREEN
Filed Aug. 24, 1939  2 Sheets-Sheet 1

Inventor
Alma F. Durtschi
By Kimmel & Crowell
Attorneys

May 6, 1941.　　A. F. DURTSCHI　　2,240,642
FISH SCREEN
Filed Aug. 24, 1939　　2 Sheets-Sheet 2
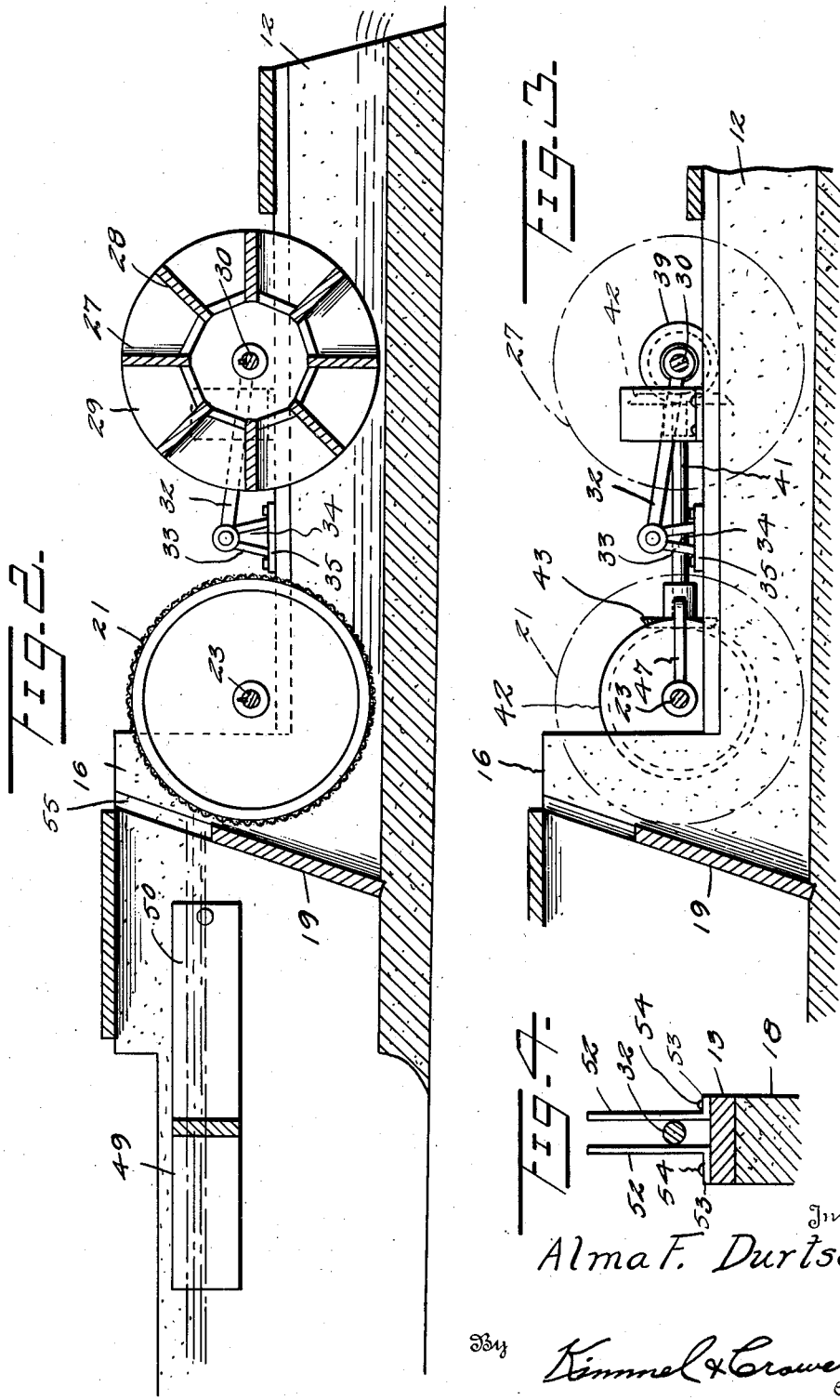
Inventor
Alma F. Durtschi
By Kimmel & Crowell
Attorneys Patented May 6, 1941

2,240,642

UNITED STATES PATENT OFFICE 2,240,642

FISH SCREEN

Alma F. Durtschi, Midway, Utah

Application August 24, 1939, Serial No. 291,749

2 Claims. (Cl. 210—173)

This invention relates to a means to prevent fish from entering irrigation canals or the like.

An object of this invention is to provide a rotatable screen which is adapted to be positioned transversely across a channel or canal wherein water is moving from a main source to irrigation canals, the means being so constructed as to permit the free passage of water through the canal while preventing fish from passing the device into the canal.

Another object of this invention is to provide a rotatable perforate member which is positioned rearwardly of a water level controlling member and which rotates upwardly and rearwardly from the point where the water first contacts with the perforate member so that floating articles will be carried upwardly and then dropped into the water behind the perforate member, the water passing through the perforate member and acting to clean the perforate member of any material which might cling thereto.

A further object of this invention is to provide a rotatable screen, a driving member for the screen in the form of a paddle wheel and means swingably supporting the paddle wheel rearwardly of the screen so that the paddle wheel will be able to move vertically in the event any large objects are carried over the top of the screen and engage beneath the paddle wheel.

A still further object of this invention is to provide a fish screen of this character wherein a number of screen drums may be disposed in axial alignment and connected together by means of a shaft, each drum being rotatably mounted in a canal and operated from a single driving means associated with one of the drums, the drums being rotated in a direction whereby the projecting surfaces thereof will move in the same direction as the movement of the water so as to thereby lift floating objects over the drums and deposit the objects on the rear sides of the drums.

To the above objects and to others which may hereinafter appear, the invention consists of the novel construction, combination and arrangement of parts as will be more specifically referred to and illustrated in the accompanying drawings, wherein is shown an embodiment of this invention, but it is to be understood that changes, variations and modifications may be resorted to which fall within the scope of the invention as claimed.

In the drawings:

Figure 1 is a plan view of a fish screen constructed according to an embodiment of this invention, Figure 2 is a sectional view taken on the line 2—2 of Figure 1, Figure 3 is a sectional view taken on the line 3—3 of Figure 1, and Figure 4 is a sectional view taken on the line 4—4 of Figure 1.

Referring to the drawings, the numerals 10 and 11 designate generally canals or water passages disposed in parallel relation, the canals being defined by outer walls 12 and 13 and an intermediate wall 14 which divides the two canals 10 and 11. The canals 10 and 11 are adapted to receive water from a main source 15 and as shown in the drawings, the outer walls 12 and 13 project outwardly into the stream 15 for a distance greater than the intermediate wall 14.

Preferably, the forward ends of the walls 12, 13 and 14 project upwardly as at 16, 17 and 18 respectively and a board or water level maintaining member 19 is disposed between the upwardly projecting portions 16 and 18 and a similar water level maintaining member 20 is positioned between the wall extensions 17 and 18. A perforate drum or screen 21 is disposed in the canal 10 and a second drum 22 is disposed in the canal 11 in axial alignment with the drum 21. A shaft 23 is secured to the two drums 21 and 22 and is journalled in bearings 24, 25 and 26 carried by the walls 12, 13 and 14 respectively.

The drums 21 and 22 are disposed closely adjacent the boards or water level determining members 19 and 20 and project above and below the upper edges of these two members, the upper edges of the water level determining members 19 and 20 being disposed slightly above the axial centers of the drums 21 and 22. The water passing over the boards 19 and 20 is adapted to pass through the drums 21 and 22 as shown in the drawings so that when the material clings to the surface of a drum on the upper side thereof, this material will be washed off of the drum as it re-enters the water on the rear side of a dam element. The drums 21 and 22 are rotated by means of a paddle wheel structure 27 in the form of a plurality of radially disposed blades 28 secured by the end plates 29 and mounted on a drive shaft 30. The paddle wheel 27 is positioned rearwardly of a screen drum and in the present instance is rearwardly of the drum 21. The shaft 30 is journalled in bearings 31 which are carried by an end of a rock lever 32. The opposite end of the rock lever 32 is rockably supported from upstanding bearings or brackets 33 which are mounted on the walls 12 and 14 rearwardly of the bearings 24 and 26. The bearings 33 as shown in the drawings are constructed in the form of inverted V-shaped members 34 provided with outwardly extending feet 35 which are mounted on the walls 12 and 14. The shaft 30 projects laterally of the wall 12 into a compartment 36 which is formed by outwardly extending walls 37 and a connecting wall 38. The shaft 30 within the compartment 36 is provided with a bevelled gear 39 and the shaft 23 also projects into the compartment 36 and is provided with a relatively large bevelled gear 40. A counter shaft 41 is disposed within the compartment 36 and at its rear end has a bevelled gear 42 fixed thereto. The counter shaft 41 at its forward end has a relatively small bevelled gear 43 fixed thereto which meshes with the bevelled gear 40. Bevelled gear 42 meshes with bevelled gear 39. The counter shaft 41 may be swingably supported so as to maintain the gears in constant mesh by means of an L-shaped bracket 44 which has one side 45 thereof provided with an opening through which the shaft 30 extends.

The other side 46 has a bearing through which the counter shaft 41 extends. In this manner the two shafts 30 and 41 will be held against movement relative to each other but may be permitted to swing as a unit with the vertical movement of the paddle wheel 27. A tie bracket of substantially L-shape also connects the counter shaft 41 with the shaft 23 and comprises one leg 47 which engages the shaft 23 and a right angularly disposed leg 48 which engages the shaft 41. In this manner the gears 40 and 43 are maintained in constant mesh during the vertical rocking of the counter shaft 41.

In order to provide a means whereby floating articles may be deflected from the canal 10 into the canal 11, I have provided a baffle or deflecting board 49 which is rockably mounted on forwardly extending supporting bars 50 and 51. The deflecting member 49 extends from the outer end of the wall 12 to the forward end of the wall 14 and projects partly above and partly below the normal water level. This board is made buoyant and by swingably mounting the board 49, the board 49 will always be maintained at the desired position so as to deflect any floating articles moving downwardly in the stream 15 to the canal 11.

In the use and operation of this device the dam members 19 and 20 are mounted across the forward end of the canals 10 and 11 and are of a height slightly above the axial center of the drums 21 and 22. The water flowing through the canal 10 will rotate the paddle wheel 27 and as this wheel rotates the drums 21 and 22 will rotate in a reversed direction, but in a direction with the upper or exposed surface thereof moving in the same direction as the movement of the water. In this manner the floating objects in the water will contact the outer and forward portion of the drums 21 and 22 and will be lifted up over the tops of these drums and then deposited in the canals 10 and 11 at the lower levels of these canals. The fish will be prevented from passing into the canals 10 and 11 due to the screens 21 and 22.

The floating material will be lifted over the tops of the screens 21 and 22 and in the event any of this material carried by the drums 21 and 22 does not drop off of the drums before the drums reenter the water in the lower levels of the canals 10 and 11, then the water flowing through the screens 21 and 22 will wash off the clinging material. In this manner the drums will be maintained in a cleaned condition at all times being of a self-cleaning type. By providing the baffle or deflector 49 across the forward end of the canal 10, the heavier floating objects are deflected into the forward end of the canal 11 where they will be lifted up over the top of the drum 22 and deposited in the lower level of the canal 11. In this manner the heavier floating articles will not enter the canal 10 and engage beneath the paddle wheel or driving member 27. By mounting the paddle wheel 27 on the swinging arms 32 in the event any large objects such as boards, logs or the like pass underneath the deflector 49 and are carried over the top of the drum 21, then the paddle wheel 27 may swing vertically upwardly as the large floating articles pass therebeneath. Normally the bearings 31 are resting freely on the tops of the walls 12 and 14.

This device has been placed in actual operation and has been found to prevent the passage of fish from the main source of water supply to canals and thus prevent the destruction of fish where the water passes from the main source of supply to irrigation canals.

In Figure 4 there is shown a guide structure for the paddle wheel levers 32 which comprises a pair of upright parallel guide bars 52 provided with right angle feet 53 secured to the sides of the canal by fastening devices 54 so as to thereby relieve the bearings 33 of lateral strain from the paddle wheel 27.

What I claim is:

1. A fish screen comprising a cylindrical screen member, a shaft secured to said member, parallel walls on opposite sides of said member, a dam element disposed between said walls forwardly of said member, the upper edge of said element being disposed above the axial center of said member, bearings on said walls for said shaft, a paddle wheel, a shaft for said wheel, a pair of levers at the opposite ends of said wheel, a shaft bearing carried by an end of each lever, means engaging said walls and the opposite ends of the levers to said walls pivotally supporting said levers, and means connecting said shafts together in a manner to rotate said screen member reversely of said wheel.

2. A fish screen comprising a pair of spaced apart axially alined cylindrical screen members, a shaft secured to both of said members, means rotatably mounting said shaft, a paddle wheel disposed rearwardly of one of said members, a shaft for said paddle wheel, a gear fixed to an end of each of said shafts, a countershaft provided with gears meshing with said first gears, and L-shaped tie member engaging said countershaft and said wheel shaft, a second L-shaped tie member engaging said counter shaft and said first shaft, a pair of wheels supporting levers, a bearing at one end of each lever for said wheel shaft, a pair of upstanding bearings, means rockably securing the opposite ends of said levers to said upstanding bearings, a wall between said screen members, a pair of outer walls, a pair of transversely extending wall members disposed forwardly of said screen members and terminating at their upper edges above the axial centers of said screen members, a deflecting member forwardly of one of said screen members, and means supporting said deflecting member from said first shaft.

ALMA F. DURTSCHI.